(12) United States Patent
Verker et al.

(10) Patent No.: US 12,331,730 B2
(45) Date of Patent: Jun. 17, 2025

(54) SHAPE MEMORY POLYMER ACTUATORS

(71) Applicants: Soreq Nuclear Research Center, Yavne (IL); Ramot at Tel-Aviv University Ltd., Tel Aviv (IL)

(72) Inventors: Ronen Verker, Yavne (IL); Debby Margoy, Tel Aviv (IL); Irina Gouzman, Yavne (IL); Eitan Grossman, Yavne (IL); Asaf Bolker, Yavne (IL); Noam Eliaz, Tel Aviv (IL)

(73) Assignee: Soreq Nuclear Research Center, Nahal Soreq (IL)

( * ) Notice: Subject to any disclaimer, the term of this patent is extended or adjusted under 35 U.S.C. 154(b) by 778 days.

(21) Appl. No.: 17/420,198

(22) PCT Filed: Dec. 29, 2019

(86) PCT No.: PCT/IB2019/061422
§ 371 (c)(1),
(2) Date: Jul. 1, 2021

(87) PCT Pub. No.: WO2020/141428
PCT Pub. Date: Jul. 9, 2020

(65) Prior Publication Data
US 2022/0065232 A1    Mar. 3, 2022

Related U.S. Application Data

(60) Provisional application No. 62/787,464, filed on Jan. 2, 2019.

(51) Int. Cl.
*G01K 1/16* (2006.01)
*C08G 59/24* (2006.01)
*C08G 77/04* (2006.01)
*C08K 3/04* (2006.01)
(Continued)

(52) U.S. Cl.
CPC ......... *F03G 7/0612* (2021.08); *C08G 59/245* (2013.01); *C08G 77/045* (2013.01); *C08K 3/04* (2013.01); *C08K 7/06* (2013.01); *F03G 7/06143* (2021.08); *G01K 1/16* (2013.01); *C08G 2280/00* (2013.01)

(58) Field of Classification Search
None
See application file for complete search history.

(56) References Cited

U.S. PATENT DOCUMENTS

| 6,117,296 A | 9/2000 | Thomson |
| 7,118,652 B2 | 10/2006 | McKnight et al. |
| 8,593,034 B2 | 11/2013 | Liu |

(Continued)

FOREIGN PATENT DOCUMENTS

WO    90/12736    11/1990

OTHER PUBLICATIONS

PCT Search Report and Written Opinion PCT/IB2019/061422, May 13, 2020.

*Primary Examiner* — Erica S Lin
(74) *Attorney, Agent, or Firm* — Dekel Patent Ltd.; David Klein

(57) ABSTRACT

Resistive heating elements are embedded in a shape memory polymer actuator. Sensing elements are associated with the resistive heating elements. The sensing elements sense changes in the resistive heating elements and correlate the changes with deformation of the shape memory polymer actuator.

7 Claims, 8 Drawing Sheets

(51) Int. Cl.
  *C08K 7/06*  (2006.01)
  *F03G 7/06*  (2006.01)

(56) References Cited

U.S. PATENT DOCUMENTS

2018/0258920 A1\* 9/2018 Kessler ................ H05B 1/0294
2021/0333203 A1\* 10/2021 Richarte .............. G01N 21/359

\* cited by examiner

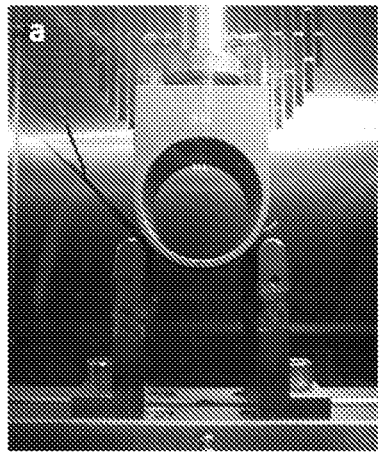
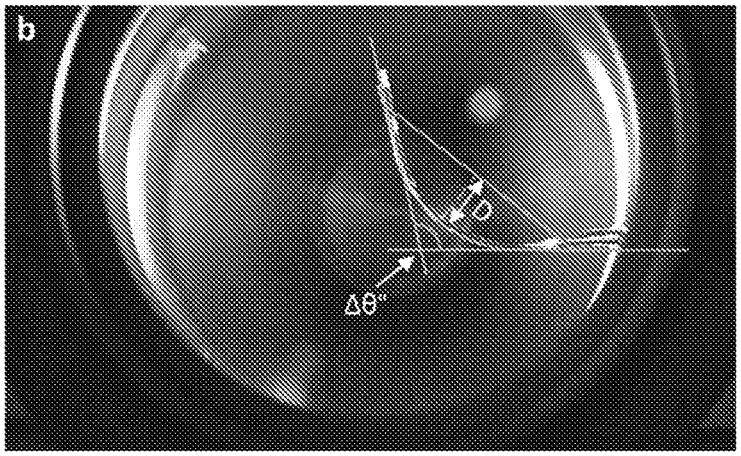
FIG. 3A
FIG. 3B
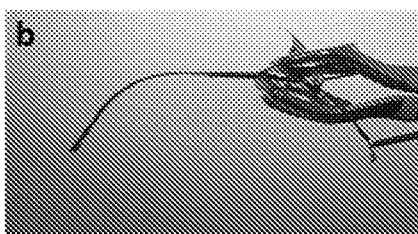
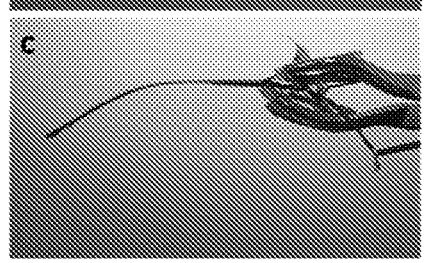
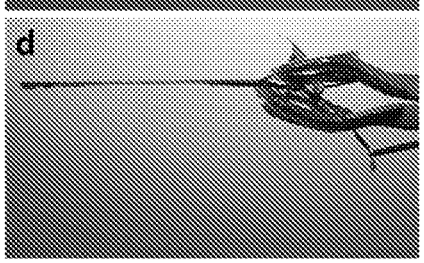
FIG. 4A
FIG. 4B
FIG. 4C
FIG. 4D FIG. 5A
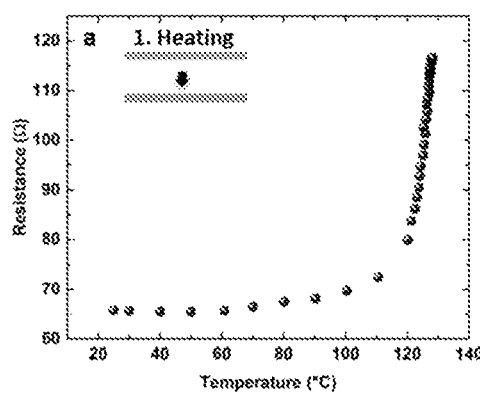
FIG. 5B
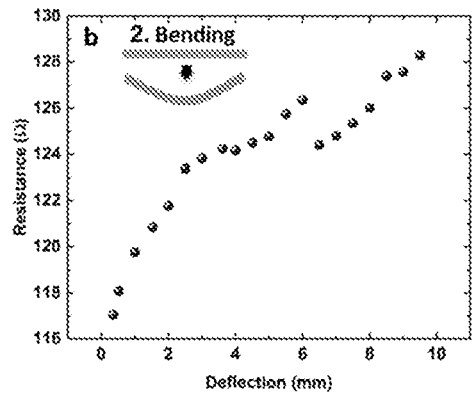
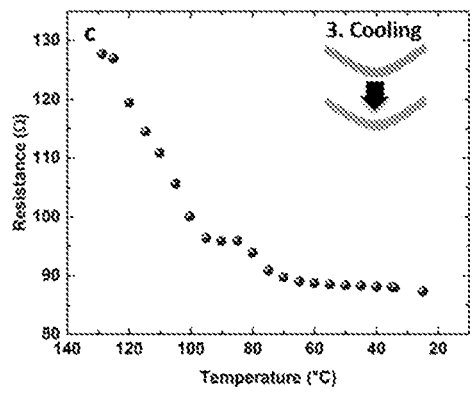
FIG. 5C
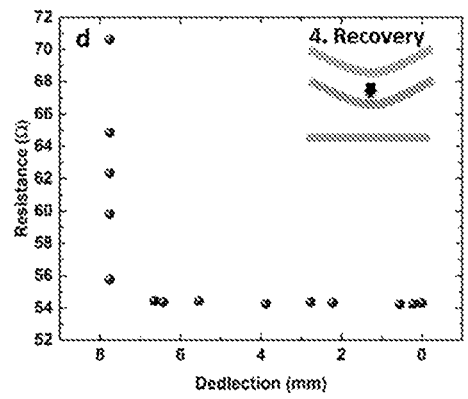
FIG. 5D FIG. 6A
FIG. 6B
FIG. 6C
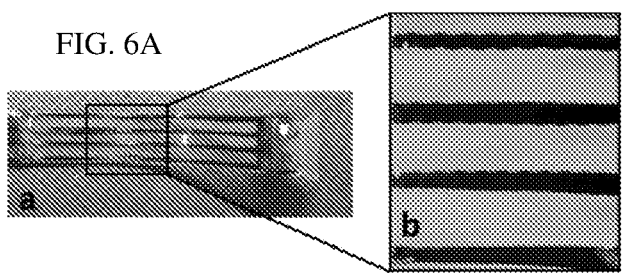
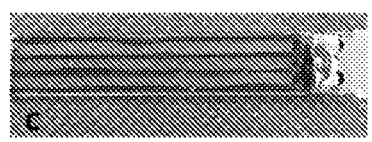
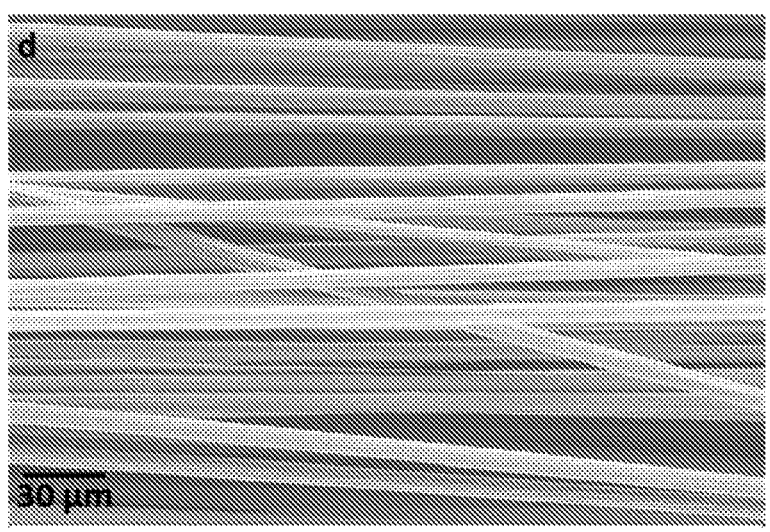
FIG. 6D
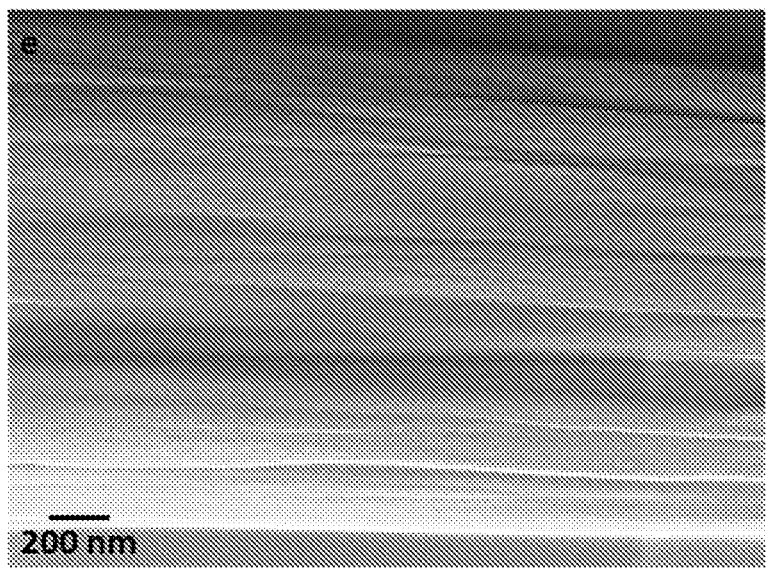
FIG. 6E

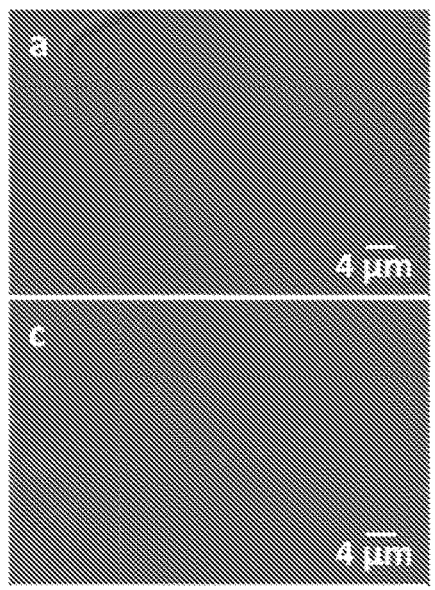
FIG. 10A
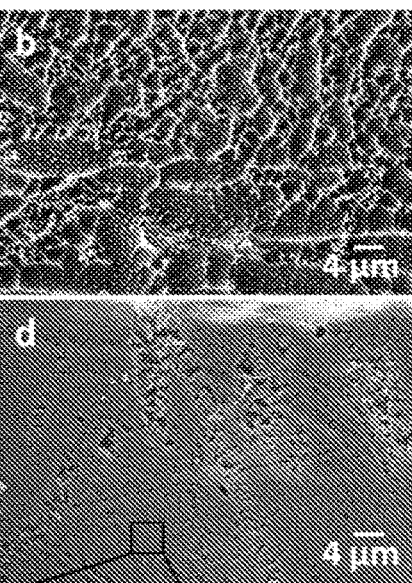
FIG. 10B
FIG. 10C
FIG. 10D
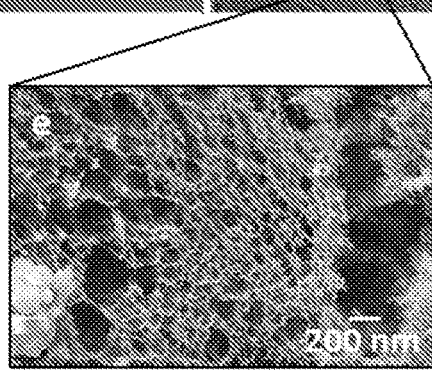
FIG. 10E

SHAPE MEMORY POLYMER ACTUATORS

FIELD OF THE INVENTION

The present invention generally relates to shape memory polymer actuators, such as for space applications and their durability in the low earth orbit space environment.

BACKGROUND OF THE INVENTION

Shape memory polymers (SMPs) are smart materials with an ability to recover their original (permanent) shape from a deformed (temporary) shape, by applying an external stimulus, such as elevated temperature. In space applications, due to their high strength-to-weight ratio and large deformability, SMPs can be used as deployable devices and replace traditional heavy metal-based mechanisms. The low Earth orbit (LEO) space environment includes hazards such as atomic oxygen (AO), UV radiation, ultrahigh vacuum (UHV), severe temperature cycles, and orbital debris. Exposure of SMPs to LEO environment might result in detrimental effects such as erosion, discoloration, and outgassing. The damage may be enhanced by the synergetic effect of space environment components; hence, materials such as SMPs must be protected and qualified for the space environment through ground-based simulation.

Most satellites are being launched into low Earth orbit (LEO) altitudes, from 200 to 800 km [1, 2]. The LEO environment involves severe conditions, such as atomic oxygen (AO), ultrahigh vacuum (UHV), micro-meteoroid and space debris impacts, ionizing ultraviolet (UV) and vacuum UV (VUV) radiation, electrostatic discharge, and thermal cycling±100° C. In order to ensure satellites survival in LEO environment, it is necessary to understand the environmental effects on the satellite materials. The most destructive constituents for materials in LEO space applications are AO and UV radiation [1, 3, 4]. Under the LEO severe conditions, the use of advanced, durable, and lightweight materials is needed. Shape memory polymers (SMPs) are good candidates for space applications, mainly due to their high strength-to-weight ratio and their ability to replace heavy metal-based mechanisms [5]. SMPs are stimuli-responsive materials that, after being deformed, have the ability to return to their pre-deformed shape by application of an external stimulus, such as light, heat, electric or magnetic fields, pH level, or ionic strength. The shape memory material "remembers" its previous shape [6-8]. The shape memory effect (SME) in SMPs results from a combination of the polymer structure and morphology together with the applied processing and programming technology [9]. SMPs are elastic polymer networks that underlie active movement. The polymer network consists of the molecular switching segment and net-point hard segments. The net-points determine the permanent shape of the polymer network and can be of either chemical (covalent bonds) or physical (intermolecular interactions) nature. The molecular switches are able to reduce their stiffness with a particular stimulus, allowing the polymer to be programmed into its temporary shape. Upon exposure to a specific stimulus, the molecular switches are triggered, and strain energy stored in the temporary shape is released, which consequently results in shape recovery [10, 11]. In the past, research has mainly focused on thermoplastic SMPs. Unfortunately, the structures made of thermoplastic SMPs lose their SME after several cycles. Therefore, thermoset SMPs with high material stiffness, high transition temperature (>~100° C.), and good environmental durability are becoming the potential selection for the production of space structures [12, 13]. Thermoelectric-triggered SMPs are promising candidate materials for space applications as other triggering mechanisms such as pH, humidity, etc., are not relevant in the LEO environment. One of the most attractive thermoelectric-triggered SMPs is epoxy adhesive [12]. Epoxy-based SMPs are favorable for space applications due to their low outgassing properties, high triggering temperature, as well as their high strength-to-weight ratio [13, 14]. Epoxy SMPs exhibit, for example, shape recovery ratio of 98-100%, and an elastic modulus of 2-4.5 GPa. In addition, they perform well when exposed to space radiation. Epoxy can be used as a matrix reinforced by carbon fibers for composite applications such as hinges, solar arrays, deployable panels, booms, and reflector-antennas [10]. Epoxy also has high resistance to wear; its surface is relatively hard due to its aromatic segments. In addition, it has high adhesion to metals due to its polarity. Reinforcement with graphite or carbon particles or fibers can improve its strength and stiffness [7, 8].

However, the effect of the LEO environment on the deployment kinetics and control of epoxy-based SMPs reinforced with carbon is not fully understood, nor is their durability to the various constituents of the LEO environment, such as AO, or the effect of vacuum conditions on its deployment.

During the service of a spacecraft, AO might interact with the SMP and affect its properties [15]. Polymers containing silicones are more resistant to AO due to formation of a $SiO_2$ passivation layer that protects the underlying polymer [9]. In previous works, a nanocomposite composed of polyhedral oligomeric silsesquioxane (POSS) additives copolymerized or blended with polyimide (PI) demonstrated the formation of a $SiO_2$ passivation layer as a result of interaction with AO that led to two orders of magnitude reduction in its erosion yield [16-18].

SUMMARY OF THE INVENTION

One non-limiting embodiment of the present invention includes resistive heating elements embedded in a shape memory polymer actuator. Sensing elements are associated with the resistive heating elements. The sensing elements sense changes in the resistive heating elements and correlate the changes with deformation of the shape memory polymer actuator.

During deformation of the SMPA the number of the inter-resistive heating element contact-points within the bundle, as well as the density of the π electrons in the case of carbon fiber-based resistive heater elements, changes. As a result, the electrical resistance changes accordingly. By measuring the electrical resistance of the resistive heating elements, the amount of deformation the SMPA is experiencing can be monitored. Furthermore, the power supply system of the SMPA can use the SMPA's electrical resistance output as a feedback to control the degree of deformation of the SMPA.

One non-limiting embodiment of the present invention also involves the coating of the SMPA with a thin metallic layer. Thermally activated SMPA loses heat through convection and radiation to the surrounding environment. However, by coating the SMPA with a thin metallic layer, it preserves its temperature by internal radiative heating process which significantly decreases the heat loss. Hence, shorter time and lower power are needed to heat the SMPA. In this process, the emitted photons are reflected back to the bulk polymer by the solar reflective thin metallic layer. In this manner, the metallic layer preserves the temperature as a solar-reflective element and reduced the SMPA's electric power consumption.

The present invention seeks to provide SMPAs that are based on an epoxy matrix and embedded carbon resistive heating wires, as well as POSS-epoxy nanocomposite SMPs. The deployment kinetics of the SMPAs was measured by the inventors under various environmental conditions; in one non-limiting embodiment, the invention provides a novel method for the improvement of the energetic efficiency for SMPAs' deployment using an aluminum coating. Means to control the SMPAs' recovery angle through electrical resistance adjustment is demonstrated, and a phenomenological model, which explains the findings, is suggested, although the invention is not limited to this model or any other explanation. The durability of the SMPAs in ground-based simulated AO environment was also studied. Methods to improve their AO durability through incorporation of POSS molecules were demonstrated, creating a novel SMPA self-passivating nanocomposite with enhanced durability to the LEO environment.

SMP actuators (SMPAs) that are based on epoxy matrix and carbon resistive heating wires were developed. Their thermal, mechanical, and electrical properties, as well as their deployment kinetics, were studied. A novel method for the improvement of the SMPAs' deployment energetic efficiency, based on an aluminum coating for internal radiative heating, was introduced. Durability improvement of the SMPAs to AO attack was achieved by copolymerization with Polyhedral Oligomeric Silsesquioxane (POSS) additive, forming an AO self-passivating novel SMP nanocomposite. Finally, a method to control the SMPA deployment via in situ electrical resistance measurements was demonstrated.

BRIEF DESCRIPTION OF THE DRAWINGS

The present invention will be understood and appreciated more fully from the following detailed description taken in conjunction with the drawings in which:

FIGS. 1A-1D are prior art illustrations of molecular structure of:

FIG. 1A: EPON 826 resin; FIG. 1B: JEFFAMINE D230 Polyetheramine crosslinker; FIG. 1C: N-Phenylaminopropyl AM0281 POSS cage; and FIG. 1D: schematics of a carbon fiber structure [19].

FIGS. 3A-3B are illustrations of (FIG. 3A) bending by INSTRON machine at 130° C., and (FIG. 3B) recovery parameters superimposed on an SMPA installed in a vacuum chamber.

FIGS. 4A-4D are illustrations of macroscopic SME by resistive heating at ambient pressure conditions: FIG. 4A: Beginning of test, SMPA in its temporary shape; FIGS. 4B and 4C: After 3 and 6 min, respectively, from the beginning of the resistive heating, and FIG. 4D: Full deployment to permanent shape.

FIGS. 5A-5D are illustrations of: FIG. 5A: $1^{st}$ stage results, resistance versus temperature during oven heating of the SMPA; FIG. 5B: $2^{nd}$ stage results, resistance versus deflection during bending of the preheated SMPA at 130° C.; FIG. 5C: $3^{rd}$-stage results, resistance versus temperature during cooling of the SMPA; FIG. 5D: $4^{th}$ stage results, resistance versus deflection during recovery of the SMPA by resistive heating.

FIGS. 6A-6E are illustrations of: FIG. 6A: SMPA after bending and cooling; FIG. 6B: Buckling of the carbon fibers due to compression stress; FIG. 6C: The SMPA after recovery; FIGS. 6D-6E: Micro- and nano-meter scale HRSEM images of carbon fibers, respectively.

FIGS. 8A-8D are illustrations of recovery of the SMPAs at ambient and vacuum conditions, with and without aluminum (Al) coating, wherein FIG. 8A shows recovery angle change (40) versus deployment time, FIG. 8B shows 40 versus deployment power, FIG. 8C shows angular velocity versus deployment time, and FIG. 8D shows resistance versus Δθ.

(FIG. 9B) temporary shape; and (FIG. 9C) final permanent shape, after SME; and FIG. 9D shows samples' mass loss versus LEO equivalent AO fluence.

FIGS. 10A-10E are illustrations of: SME of 15 wt. % POSS-epoxy SMP sample in its (FIG. 10A) initial permanent shape, before SME; (FIG. 10B) temporary shape; and (FIG. 10C) final permanent shape, after SME; and FIG. 10D shows samples' mass loss versus LEO equivalent AO fluence HRSEM images of (a, c) epoxy reference and POSS-epoxy SMPs, respectively, before exposure to AO, and (b, d) epoxy reference and POSS-epoxy SMPs, respectively, after exposure to LEO equivalent AO-fluence of $1\times10^{20}$ O-atoms/$cm^2$; and FIG. 10E shows a high-resolution image of the POSS-epoxy SMP after exposure to LEO equivalent AO.

DETAILED DESCRIPTION OF EMBODIMENTS

Adhesive for the SMPA was prepared from EPON 826 DGEBA resin (Momentive, Inc.) and JEFFAMINE D230 Poly (propylene Glycol) bis (2-Aminopropyl) Ether crosslinker agent (Huntsman Chemicals, Inc.). AM0281 N-Phenylaminopropyl POSS cage mixture additive (Hybrid Plastics, Inc.) was mixed with the amino-based crosslinker to create 15 wt. % POSS-epoxy actuator. The chemical structures of these materials are shown in FIGS. 1A-1D. In addition, 3k-70-p, type 2, grade 3, class 1 polyacrylonitrile (PAN)-based carbon fiber yarn (Hexcel Inc.) was used.

Four types of epoxy-based SMPAs were prepared using an aluminum mold, in which carbon fibers were immersed into the cavity, and epoxy adhesive was poured above. The materials used for the various SMPs and SMPAs prepared in this work are summarized in Table 1.

Epoxy resin was mixed with the crosslinker agent in a volume ratio of 2.52:1, respectively [in accordance with ref. 20]. Both materials were preheated to 50° C. and added to a vial. The vial was first shaken vigorously by hand, and then by Vortex shaker for 1 minute at 30 rpm. Next, the vial was placed in a vacuum oven, which was preheated to 50° C., for degassing at a pressure of less than 10 mmHg. After 13 minutes, the vial was taken out, and the adhesive was ready to be poured into the mold.

TABLE 1

Composition of the epoxy based SMPs and SMPAs.

| SMP/SMPA | EPON 826 (wt. %) | JEFFAMINE D230 (wt. %) | AM0281 POSS (wt. %) | Carbon fiber | Aluminum coating |
|---|---|---|---|---|---|
| Epoxy-reference | 75.5 | 24.5 | — | — | — |
| POSS-Epoxy | 67.6 | 17.4 | 15.0 | — | — |
| Epoxy-carbon | 75.5 | 24.5 | — | ✓ | — |
| Aluminum-coated Epoxy-carbon | 75.5 | 24.55 | — | ✓ | ✓ |

Figure 1A:
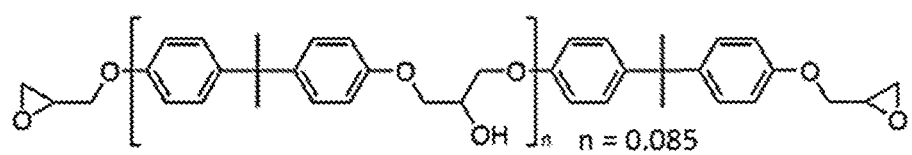
Figure 1B:
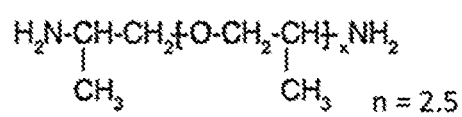
Figure 1C:
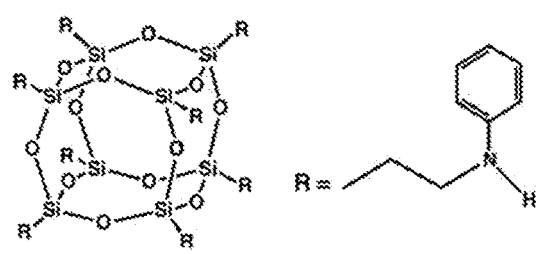
Figure 1D:
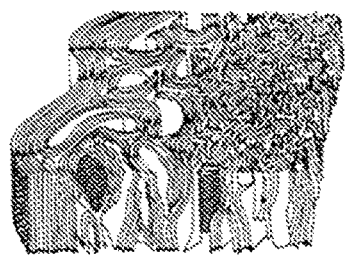
Figures 2A, 2B, 2C:
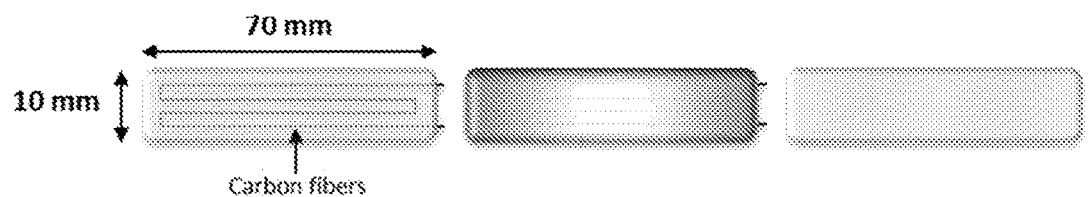
FIGS. 2A-2C are illustrations of (FIG. 2A) epoxy-carbon SMPA (including a resistive heater with a w-like architecture), (FIG. 2B) aluminum-coated epoxy-carbon SMPA, and (FIG. 2C) epoxy-reference and POSS-epoxy samples.

Before pouring the adhesive, the molds, having inner dimensions of 70×10×1 mm³, were coated with a WATER-SHIELD release agent (Zyvax, Inc.). In the next stage, the carbon fibers were connected to electrical wires and were placed in the mold. Next, 0.8 mL of the adhesive was poured into each mold. The epoxy adhesive was thermally cured at 100° C. for 1.5 h, and post-cured at 130° C. for another 1 h [in accordance with ref. 20]. Upon completion of curing, the mold was cooled to room temperature (RT), and the epoxy-based SMPAs were demolded. FIG. 2a depicts the SMPA scheme, including the resistive heaters' w-like architecture. Some of the samples were coated with 100 nm thick aluminum coating, using electron beam physical vapor deposition (EBPVD) at 1 Å/s rate, 2×10° Torr, and RT conditions, as schematically illustrated in FIG. 2b. Additional samples of pristine epoxy and POSS-epoxy were prepared in the same manner, without carbon fibers and without aluminum coating, see FIG. 2c. The POSS additive was pre-mixed with the crosslinker at 50° C. A molar ratio of 1:1 was kept between the primary amine groups of the crosslinker and the amine groups from the POSS that replaced them, while the overall POSS content was set to 15 wt. %.

The SMP samples and SMPAs were deformed to a u-like shape using 3-point bending grips, mounted on an INSTRON 3365 universal machine, equipped with an environmental chamber and a 100 N load cell. The bending was performed by using a 22.8 mm radius "upper nose", see FIG. 3a. This setup was used for fixing the SMPAs in their temporary shape, at a temperature of 130° C., using the environmental chamber, and then cooling to RT while keeping the SMPAs under load. The SMPAs were deflected to a maximum strain of 2.4% at 0.4 mm/min crosshead speed and 42 mm support span. 2.4% strain is equivalent to 9.5 mm deflection, according to Equation 1 [in accordance with ref. 21].

$$\varepsilon = \frac{6Dd}{L^2} \times 100 \tag{1}$$

where ε (%) is strain, D (mm) is the deflection, d (mm) is the thickness of the sample, and L (mm) is the support span.

The SME of the SMPAs was measured either at ambient pressure or in vacuum (5.5×10⁻⁴ Torr) using resistive heating. The recovery effect was recorded by a video camera, and was quantified by the following values: recovery angle (10) and deflection (D), see FIG. 3b, where at t=0, Δθ=0° and D=$D_{max}$.

The surfaces of the SMP samples were characterized by a high-resolution scanning electron microscope (HRSEM) equipped with a secondary electrons detector (model Sigma 300 VP from Zeiss). Images of the epoxy reference and POSS-epoxy samples were collected in a variable pressure mode. This enabled measurements of the insulating samples without the application of a conductive coating [compare ref. 22].

The durability of the reference and POSS-containing epoxy SMP samples to AO attack was measured by a ground-based AO simulation facility that is based on a radio frequency (RF) plasma source (Litmas RPS). The source operates at a maximum power of 3 KW, a frequency of 1.7-3.0 MHz, and an $O_2$ feed. During the experiment, the samples were held in the RF plasma source vacuum chamber for a total exposure time of 260 h; they were removed periodically from the vacuum chamber for measurement of their mass loss. The mass loss is used to calculate the material's LEO equivalent AO-fluence. The experiment parameters were: pressure of 6×10⁻² Torr, power of 810 W, and $O_2$ flow rate of 12 sccm. Under these conditions, a current of 20 µA was measured between the sample holder and the ground, using a picoammeter (model 485 from Keithley). This current was used to monitor the RF plasma performance.

The LEO equivalent AO-fluence was calculated by measuring the mass loss of a Kapton sample, which was simultaneously exposed to the AO beam, assuming an erosion yield of 3×10⁻²⁴ cm³/O-atoms [23], see Equation 2 [in accordance with ref. 17].

$$F = \frac{\Delta m}{\rho AE} \tag{2}$$

where Δm is the mass loss (g), A is the material's exposed area (cm²), ρ is the material's density (g/cm³), F is the equivalent AO fluence (O-atoms/cm²), and E is the erosion yield (cm³/O-atom).

FIG. 4 depicts a visual description of the shape recovery of the SMPA. In this experiment, the SME was obtained by resistive heating under ambient pressure conditions. The current was increased gradually at a constant rate of 0.03 A/min to avoid uneven heat distribution and, as a result, uneven strains that can lead to local failures. Full recovery was accomplished after 7 min, using resistive heating current of 0.21 A, see FIG. 4d. The recovery effect started just after the actuator reached a temperature equal to the glass transition temperature of the epoxy.

SMPA Recovery Control Through Electrical Resistance Measurements

During bending and shape memory recovery cycles of the SMPA, changes between the electrical resistance at the permanent and the temporary shapes, as well as at different temperatures, were observed. Hence, it was decided to study the influence of bending and temperature on the electrical resistance of the actuators while separating these variables. This methodology was used to control the recovery angle, and may be used in future space deployable mechanisms to control a deployment process. In order to investigate the effect of temperature and bending on the actuators' electrical resistance, an experiment was performed in four stages: 1) heating, 2) bending, 3) cooling, and 4) recovery by resistive heating. The resistance was calculated using Ohm's and Pouillet's laws, see Equation 3 [in accordance with ref. 24, 25].

$$R = \frac{V}{I} = \frac{\rho L}{A} \tag{3}$$

where R (Ω) is the resistance, V (V) is the voltage, I (A) is the current, ρ (Ω·m) is the resistivity, L (m) is the length, and A (m$^2$) is the cross-sectional area.

FIG. 5a shows the electrical resistance as a function of temperature at the 1$^{st}$ stage during oven heating of the SMPA in its permanent shape. During heating to a temperature of 130° C., its resistance increased by 77%, from 66Ω to 117Ω. This increase is composed of two phases. The first shows a relatively small increase in resistance, from 66Ω to 72Ω as the SMPA is heated from RT to 110° C. Above 110° C., an abrupt increase in resistance is observed, reaching 117Ω at a temperature of 128° C. This phenomenon has been previously observed for epoxy resins filled with carbon fibers at various aspect ratios [refs. 26, 27]. While the first phase depicts the resistance change due to the change in the graphite fiber metallic conductivity, the second abrupt increase in resistance is associated with mechanical changes in the epoxy resin itself. The actuator's semicrystalline carbon fibers contain unordered plains of hexagonally arrayed sp$^2$ carbon atoms sheets. Electrical current passes through the carbon fiber by π electrons, below and above these sheets (parallel to the basal xy plane). The mobility of the π electrons is similar to the behavior of electron gas in metals [ref. 28]. During the first phase, while heating the SMPA in the environmental chamber, electron scattering increases due to increased thermal vibrations of the atoms, i.e., collisions between the electrons and the phonons, and lattice irregularities, e.g., vacancies [refs. 24, 29], resulting in smaller electron mean free path (MFP) [ref. 28]. The abrupt increase in resistance during the second phase of the heating process is associated with mechanical changes in the epoxy resin itself. The reason for this positive temperature coefficient (PTC) effect is the breaking-off of inter-fiber contacts. The carbon fibers embedded in the epoxy are composed of micron-sized filaments, with a very small distance between them. When the polymer matrix shrinks during the curing and final cooling processes, residual compressive strain is stored in the polymer gap between the fibers, as the carbon fibers were pushed together. During heating, as the material becomes rubbery, the thermal expansion of the epoxy will compensate for the residual strain, and at a critical temperature will lead to the separation of the fibers, thus lowering the number of inter-fiber contacts. Consequently, the temperature at which the PCT effect occurs is highly dependent on the curing temperature. In this case, the epoxy was cured at 100° C. and 130° C.; therefore the PCT effect started at an intermediate temperature, and was observed above 110° C. Thus, during the 1$^{st}$ stage, the dominant mechanism that affects the SMPA's resistivity is electron scattering and reduction of inter-fiber contacts, which increases the resistivity during the heating [ref. 25].

According to Equation 3, the resistance may also be affected by dimensional changes in the carbon fiber's length and cross-section area. In order to evaluate the influence of the temperature on these parameters, the linear expansion was calculated according to Equation 4 [in accordance with ref. 30]:

$$\Delta L = L_0 \alpha \Delta T \quad (4)$$

where ΔL is the dimensional change, L$_0$ is the initial dimension, α is the coefficient of thermal expansion, and ΔT is the temperature change.

The carbon fiber's coefficient of thermal expansion in its z direction is extremely low and negative, $-4.1 \times 10^{-7}$ °C.$^{-1}$ [31]; it is about $2 \times 10^{-5}$ °C.$^{-1}$ in its x or y directions [in accordance with ref. 28]. The length of the carbon fiber is 26 cm per SMPA, whereas the typical cross-sectional area of a single fiber filament is 38.5 μm$^2$ [in accordance with ref. 31]. Therefore, the fiber's longitudinal thermal dimensional change is 13.7 μm, merely $5 \times 10^{-3}$% change. The thermal expansion of the fiber's cross-sectional area was also very small, only 0.2%. Thus, through the 4 stages of the SMPA recovery control experiment, L was set constant, and in stage 1 the cross-sectional area was considered constant too.

FIG. 5b shows the 2nd-stage results of resistance versus deflection measurements during bending of the SMPA to its temporary u-like shape. An increase in the resistance by 9.1%, from 117Ω to 128Ω, was measured. This increase may be due to two possible reasons. First, a sufficient number of fractured carbon monofilaments, or disconnection of nearby filaments at certain points, due to the bending, may lead to lower cross-sectional area for electron current, if those filaments became electrically disconnected [in accordance with ref. 32]. Second, the carbon fiber buckling deformation, which occurred during the bending test [in accordance with refs. 33, 34], as shown in FIGS. 6a and b. In the z-direction (normal to the graphitic basal planes), the spacing between the graphite sheets presumably becomes larger due to buckling. Hence, the density-of-state of the π electrons decreased, and higher resistance was measured as the electrons were forced to move a larger distance from one graphite sheet to the other [ref. 29]. FIG. 6d presents HRSEM images of the carbon fibers, demonstrating the inter-fiber contact points between nearby filaments. FIG. 6e presents the HRSEM image of a single filament composed of interconnected fibrils having diameters of 20-50 nm.

FIG. 5c depicts the electrical resistance as a function of temperature in the 3$^{rd}$ stage during cooling of the SMPA to RT in its temporary shape. During cooling, the resistance of the bended SMPA decreased by 32%, from 128Ω to 87Ω. During cooling, one parameter may lead to an opposite effect that may increase the actuator resistivity and, hence, its resistance. This parameter concerns the residual stresses that may increase between the matrix and the fibers during cooling due to the shrinkage of the thermoset matrix around the fibers [ref. 35], thus increasing the buckling effect. However, the actual decrease in the resistance during cooling indicates that another, more dominant, parameter exists. It is assumed that this parameter is the reduction in electron-scattering events. At lower temperatures, fewer electron-scattering events occur and, hence, the resistivity and resistance decrease [refs. 24, 25, 28].

FIG. 5d depicts 4$^{th}$-stage results of resistance versus deflection measurements during recovery of the actuator to its permanent shape by gradual resistive heating. The resistive heating itself is a result of retarding forces and collisions involving charge carriers, usually electrons [ref. 24]. A drastic decrease in the resistance by 23%, from 70Ω to 54Ω, after deployment of less than 1 mm was observed. This drastic decrease may be attributed to two factors. First, when the SMPA reached the glass-transition temperature, the residual stresses and the buckling deformation were released immediately as SME started, leading to closer graphite aligned sheets, higher density of π electrons and, thus, lower resistivity. Second, instant alternative connecting points are formed between the carbon fibers during the deployment of the SMPA in the initial deployment stage, which leads to higher cross-sectional area for electron current and, hence, the electrical resistivity and resistance decrease. FIG. 6c demonstrates the disappearance of the carbon fibers' buckling at the end of the SME. The phenomenon of instant decrease in electrical resistance during the SMPA's deployment may be used for indication and control of the SMPA deployment process while in space.

Figure 7:
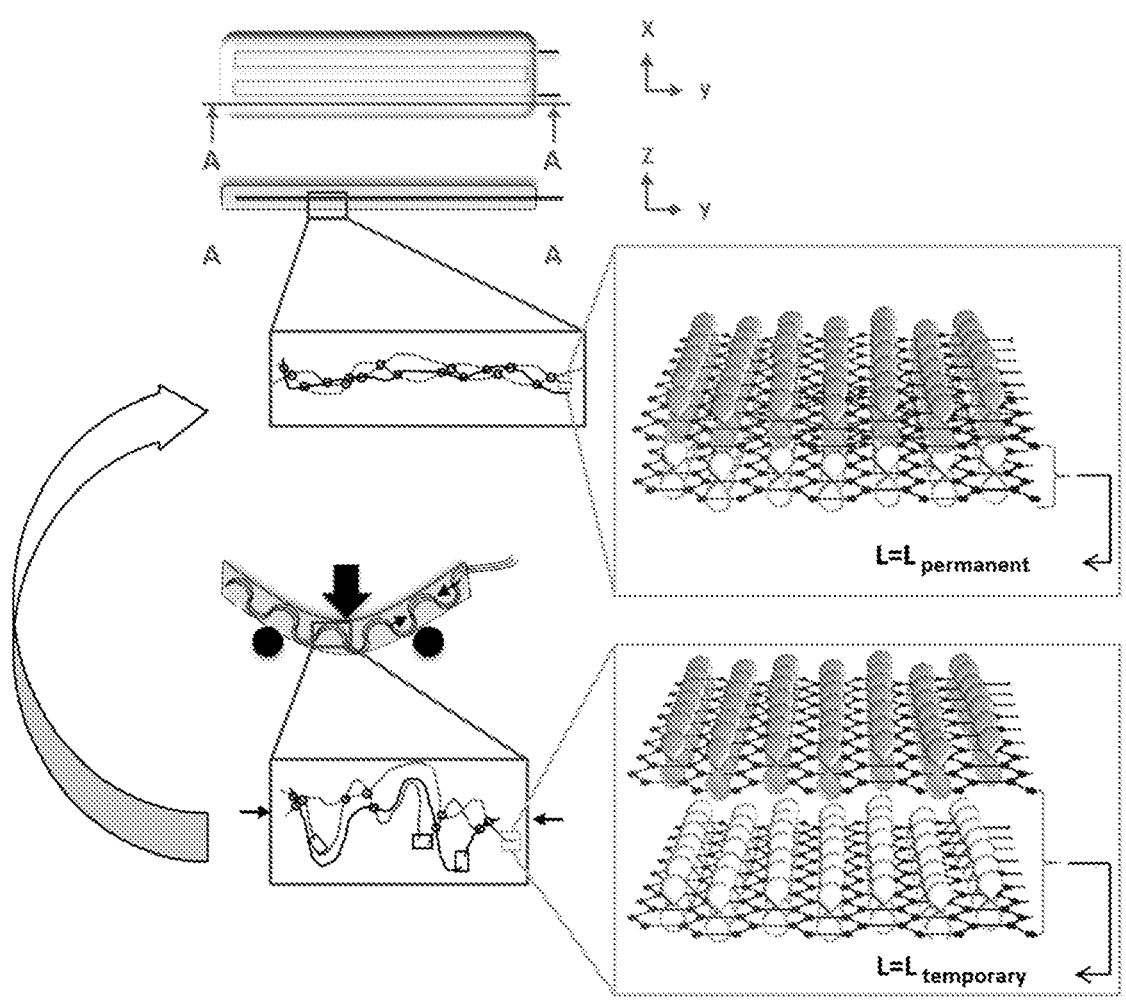
FIG. 7 is an illustration of a phenomenological model, which demonstrates the major parameters that influence the SMPA's electrical resistance during bending, on the micro- and macro-structure levels.

FIG. 7 presents a phenomenological model, which demonstrates the major parameters that influence the SMPA's resistance during bending, on the micro- and macro-structure levels. This model demonstrates the structure-property dependency, which leads to the resistance decrease during deployment, by using three hierarchies: actuator level, carbon fiber macrostructure level, and graphite sheets molecular level. The actuator level depicts the permanent and the temporary shapes of the actuator, and the associated buckling effect. The carbon fiber macrostructure level shows the fibers in the aligned and buckled position. The circles around the monofilaments depict the monofilament-to-monofilament electrical contact points, and the rectangles show monofilaments fractured due to bending. In the permanent shape, a larger number of contact points exist between the monofilaments. During bending, the monofilaments are far apart, and some of them are fractured. The molecular level depicts the plains of graphite sheets in the carbon monofilament and the π electrons below and above these sheets. The distance between the sheets becomes larger ($L_{temporary} > L_{permanent}$) during bending, hence the density-of-state of the π electrons presumably decreased.

Although heating per se increases the carbon fibers' resistivity, during recovery by resistive heating, resistivity decreases sharply. The dominant parameters during recovery, which lead to this decrease in the resistance, are the increase in the number of the inter-fiber contacts and the density of the π electrons.

The Kinetics of SMPAs in Space-Simulated Conditions

The dominant heat transfer mechanisms are different under ambient and under vacuum conditions. At ambient pressure, the dominant mechanisms of heat transfer to the surrounding atmosphere are convection and conduction, while in vacuum the main mechanism is radiation [ref. 36]. The influence of the vacuum effect on the SMPAs' deployment kinetics was tested in order to simulate the UHV conditions in LEO. In addition, in order to improve the energetic efficiency of the SMPAs' deployment, a novel approach was developed, which is based on an internal reflectance heating mechanism. Implementation of this mechanism was done by coating the SMPAs with a 100 nm aluminum coating. Aluminum offers high reflectivity in the near-IR and, hence, can be used as solar reflector of the IR photons, which are emitted during the resistive heating process.

Figure 8A:
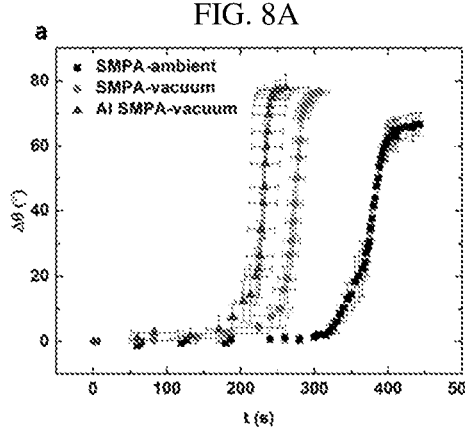
Figure 8B:
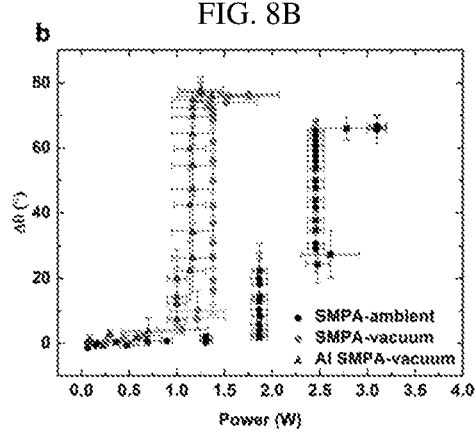
Figure 8C:
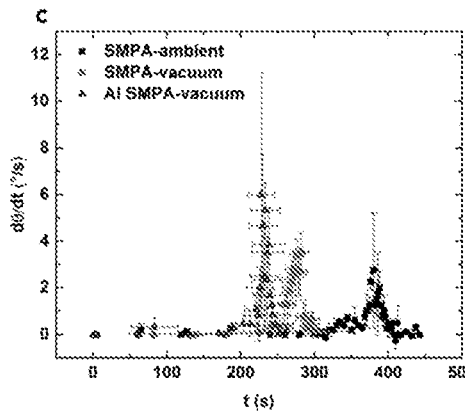
Figure 8D:
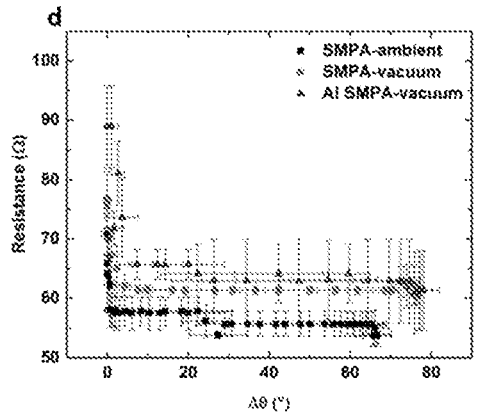

The SMPAs were recovered in both ambient and vacuum conditions, while aluminum-coated SMPAs were recovered only in vacuum conditions. FIG. 8 presents the recovery kinetic parameters of the SMPAs under both ambient and vacuum conditions, with and without aluminum coating. Each curve is the average of three experiments. FIG. 8a depicts the SMPAs' deployment kinetics in terms of recovery angle change ($\Delta\theta$) versus time. The maximum bending angle was defined as $\Delta\theta=0°$. FIG. 8b shows the SMPAs' deployment kinetics in terms of 40 versus the actuator's power consumption. FIG. 8c presents the angular velocity ($d\theta/dt$) versus deployment time, while FIG. 8d presents the SMPAs' electrical resistance versus $\Delta\theta$. FIG. 8a-c show a general trend in all 3 cases of almost instantaneous deployment that occurred after a certain dwell time. The highest values of 310 s dwell time, 97 s recovery duration, and 2.46 W recovery power were observed at ambient pressure for the epoxy-carbon SMPA. Performing the epoxy-carbon SMPA deployment experiment under vacuum conditions resulted in moderate values of 224 s dwell time, 72 s recovery duration, and 1.53 W recovery power. The lowest values of 171 s dwell time, 71 s recovery duration, and 1.17 W recovery power were observed under vacuum conditions by the aluminum-coated epoxy-carbon SMPA. These results prove the benefit of coating the SMPAs with aluminum, as deployment power consumption (under vacuum conditions) dropped by 25% as a result of this process.

During the recovery stage, electrical current passes through the carbon fibers and produces resistive heating. In this test, the current was set to produce a temperature of around 130° C., above the glass transition temperature of the SMPA. According to Wein's law [37], at this temperature the emitted heat from the actuator has a typical wavelength of 7.2 μm. At ambient pressure, the SMPA loses heat through convection to the surrounding air and, hence, longer time and higher power are needed to heat it. Under vacuum conditions, the aluminum-coated SMPA preserved its temperature by internal radiative heating process. In this process, the emitted photons were reflected back to the bulk polymer by the solar reflective aluminum coating. In this manner, the aluminum coating preserved the temperature as a solar-reflective element and reduced the electric power consumption, as shown in FIG. 8b.

The results presented in FIG. 8c show that at ambient pressure, the epoxy-carbon had the longest dwell time, lowest angular velocity, and wider velocity distribution. In vacuum, the maximum velocity was higher, and the distribution of the angular velocity was symmetric and narrow. These results indicate that the deployment in vacuum occurred at a short and specific period of time when reaching the glass transition temperature. The deployment was even shorter for the aluminum-coated epoxy-carbon SMPA. The values of the angular velocity were 2.75°/s for the epoxy-carbon SMPA at ambient pressure, 3.5°/s for the epoxy-carbon SMPA in vacuum, and 6°/s for the aluminum-coated epoxy-carbon SMPA in vacuum.

FIG. 8d shows the electrical resistance versus recovery angle change of the SMPAs at ambient and vacuum conditions, with or without aluminum coating. A sharp decrease in the resistance at the beginning of the deployment, and a lower decrease during the rest of the deployment, are evident. Furthermore, the highest resistance was obtained under vacuum conditions for the aluminum-coated epoxy-carbon SMPA. The lowest resistance was measured under ambient conditions for the epoxy-carbon SMPA. The decrease in the actuator's resistance was due to the release of the buckling deformation and the residual stresses, as analyzed previously in Section 3.2. The higher the temperature of the SMPA, the higher its resistance, as shown in FIG. 5a. The aluminum-coated epoxy-carbon SMPA operated under vacuum conditions reached the highest temperature due to internal IR reflections, and therefore showed the highest measured resistance. The epoxy-carbon SMPA operated in ambient conditions reached the lowest temperature, due to heat losses through convection and conduction to the surrounding atmosphere, and therefore showed the lowest measured resistance.

To briefly summarize this part, the main heat transfer mechanisms for the SMPA in ambient condition are convection and conduction to the surrounding air. In vacuum condition, the main heat transfer mechanism is radiation; hence, heat losses are much smaller. As a result, the energy consumption in vacuum conditions is also much smaller. Coating the epoxy-carbon SMPA with aluminum further decreases its energy consumption by internal radiation, which further decreases heat losses. Hence, internal aluminum coating can save power during the deployment process in space.

POSS-Epoxy SME and Durability to AO

Figure 9A:
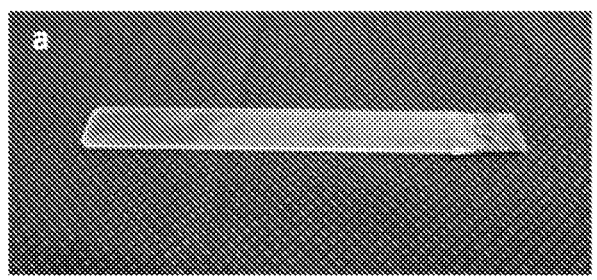
FIGS. 9A-9D are illustrations of SME of 15 wt. % POSS-epoxy SMP sample in its (FIG. 9A) initial permanent shape, before SME.
Figure 9B:
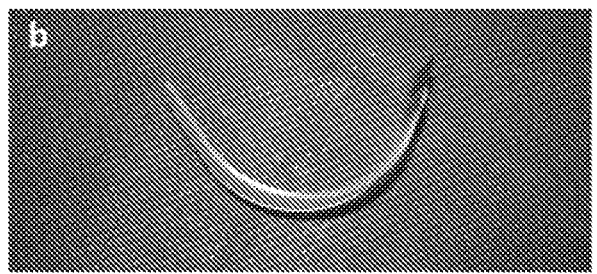
Figure 9C:
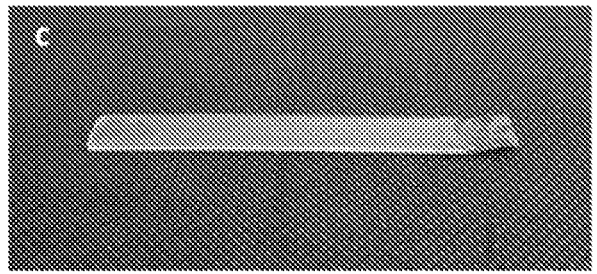

Incorporation of POSS monomers into the epoxy adhesive by copolymerization may improve its durability to AO attack by formation of $SiO_2$ passivation layer. The AO oxidizes the $SiO_{1.5}$ POSS into $SiO_2$ [16]. Hence, reference and POSS-containing epoxy SMP samples were exposed to oxygen RF-plasma, which simulates AO irradiation. The SMP samples were removed periodically from the system for a short period of time in order to measure their mass loss. Prior to the AO exposure, the SME of the POSS-epoxy sample was verified. The POSS-epoxy SMP sample was exposed to an elevated temperature of 100° C. in a hot bath, bended to a u-like temporary shape, fixed in its temporary shape in a cold bath, and exposed again to an elevated temperature until SME occurred and the sample returned to its permanent shape, see FIG. 9a-c. As shown, the POSS-epoxy sample fully recovered to its original permanent shape, exemplifying the potential of this nano-composite material system as an SMP.

Figure 9D:
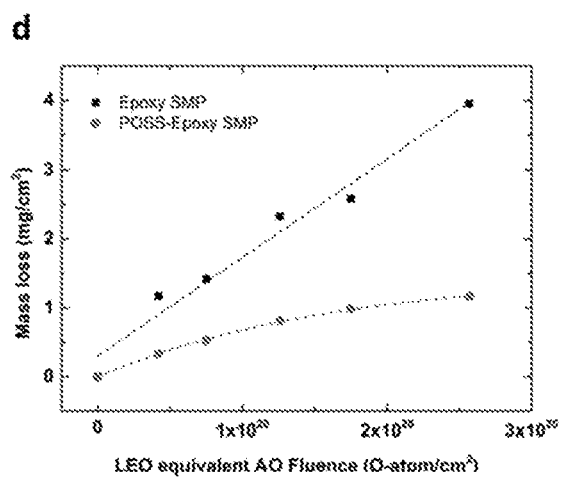

FIG. 9d depicts the mass loss ($\Delta m$) of epoxy-reference and POSS epoxy SMPs during ground-based AO-irradiation, as a function of the LEO equivalent AO fluence. The epoxy reference mass loss under a LEO equivalent AO fluence of $2.6 \times 10^{20}$ O-atom/cm$^2$ was 3.95 mg/cm$^2$. In comparison, the POSS epoxy SMP mass loss under the same LEO equivalent AO fluence was only 1.17 mg/cm$^2$, a reduction of 70% compared to the epoxy-reference SMP. Furthermore, while the mass loss of the epoxy-reference versus the LEO equivalent AO fluence was linear, the mass loss of the POSS-epoxy decreased gradually as the LEO equivalent AO fluence increased. This implies a gradual formation of a $SiO_2$ passivation layer during the AO irradiation [3].

FIG. 10 shows HRSEM images of the surface morphology of epoxy reference and POSS-epoxy SMPs, before and after AO attack. Before AO attack, smooth surfaces are shown (FIGS. 10a and c) for both epoxy and POSS-epoxy samples. After AO attack, the epoxy-reference surface was eroded to a carpet-like morphology (FIG. 10b), while the surface of POSS-epoxy is characterized by a sponge-like morphology formed presumably by the $SiO_2$ self-passivating network (FIGS. 10d and e) [16], which increased its durability to AO attack.

Unique epoxy-carbon SMPAs were designed as building blocks for future space applications. Their SME parameters, electrical properties, as well as their durability in vacuum and AO environments, were evaluated. During resistive heating and deployment, a rapid decrease in the SMPAs' electrical resistance occurs. This effect is caused by temperature and by the SMPAs' deflection state. During deployment, the carbon fibers abruptly unbuckle, compression stresses are immediately released, and new electrical connecting points are formed between the fibers. Therefore, the carbon fibers serve two purposes-heating elements as well as deployment control detectors. The SMPAs' resistance measurement can serve as an important tool for controlling the recovery angle during deployment in space.

During resistive heating and deployment of the SMPA, electrical current passes through the carbon fibers and produces heat. At ambient pressure, the actuator loses heat mainly by convection and conduction to the surrounding environment; hence, long time and relatively high power are needed. In vacuum conditions, the deployment of the SMPA is faster and consumes less power (because less heat is lost), as the main mechanism of heat transfer to the surrounding environment is radiation. When the novel aluminum-coated SMPA is deployed in vacuum conditions, the coating preserves the SMPA's temperature more efficiently by an internal radiative heating process, as photons are reflected back to the bulk polymer by the reflective aluminum coating. In this manner, the aluminum coating can save power during the deployment process.

Copolymerization of POSS monomers with epoxy increases their AO erosion durability and reduces mass loss during irradiation by 70%. The surface of the AO post-irradiated POSS-epoxy is characterized by a sponge-like morphology. These results indicate the formation of a $SiO_2$ passivation layer, which increases the POSS-epoxy SMP durability to AO.

It is important to note that the references mentioned above are only mentioned for ways to measure values or for reference purposes, and in no way anticipate the invention or make the invention obvious.

REFERENCES

1. Laikhtman, A., et al., *Atomic oxygen and UV irradiation effects on fluorosilicone rubber: comparison of RF plasma and in-flight exposure*. High Performance Polymers, 2008. 20 (4-5): p. 447-460.
2. Verker, R., et al., *Residual stress effect on degradation of polyimide under simulated hypervelocity space debris and atomic oxygen*. Polymer, 2007. 48 (1): p. 19-24.
3. Wang, X., et al., *An experimental study on improving the atomic oxygen resistance of epoxy resin/silica nanocomposites*. Polymer Engineering & Science, 2007. 47 (7): p. 1156-1162.
4. Grossman, E. and I. Gouzman, *Space environment effects on polymers in low earth orbit*. Nuclear Instruments and Methods in Physics Research Section B: Beam Interactions with Materials and Atoms, 2003. 208: p. 48-57.
5. Pater, R. H. and P. A. Curto, *Advanced materials for space applications*. Acta Astronautica, 2007. 61 (11-12): p. 1121-1129.
6. Callister, W. D. and D. G. Rethwisch, *Materials Science and Engineering An Introduction 7th ed.* John Wiley & Sons, Inc., 2007. 348-350.
7. Tobushi, H., et al., *Two-way bending properties of shape memory composite with SMA and SMP*. Materials, 2009. 2 (3): p. 1180-1192.
8. Zheng. X., et al., *Shape memory properties of poly (D, L-lactide)/hydroxyapatite composites*. Biomaterials, 2006. 27 (24): p. 4288-4295.
9. Orwoll, R. A., *Additives to reduce susceptibility of thermosets and thermoplastics to erosion from atomic oxygen*. NASA/AMERICAN SOCIETY FOR ENGINEERING EDUCATION (ASEE) SUMMER FACULTY FELLOWSHIP PROGRAM 1990, 1990: p. 93.
10. Leng. J., et al., *Shape-memory polymers and their composites: stimulus methods and applications*. Progress in Materials Science, 2011. 56 (7): p. 1077-1135.
11. Bchl, M. and A. Lendlein, *Shape-memory polymers*. Materials today, 2007. 10 (4): p. 20-28.
12. Liu, Y., et al., *Shape memory polymers and their composites in aerospace applications: a review*. Smart materials and structures, 2014. 23 (2): p. 023001.
13. Wu, Y., et al., *A facile approach to fabricate a UV/heat dual-responsive triple shape memory polymer*. Journal of Materials Chemistry A, 2015. 3 (1): p. 97-100.
14. De Groh, K. K., et al., *MISSE 2 PEACE polymers atomic oxygen erosion experiment on the international space station*. High Performance Polymers, 2008. 20 (4-5): p. 388-409.

15. Paillous, A. and C. Pailler, *Degradation of multiply polymer-matrix composites induced by space environment*. Composites, 1994. 25 (4): p. 287-295.
16. Brunsvold, A. L., et al., *An investigation of the resistance of polyhedral oligomeric silsesquioxane polyimide to atomic-oxygen attack*. High Performance Polymers, 2004. 16 (2): p. 303-318.
17. Verker, R., *Effect of a Simulated Low Earth Orbit Environment on Durability of POSS-polyimide Hybrid Nanocomposites*. Ph.D. Thesis., 2011. Tel-Aviv University.
18. Gonzalez, R. I., *Synthesis and In-Situ Atomic Oxygen Erosion Studies of Space-Survivable Hybrid Organic/Inorganic Polyhedral Oligomeric Silsesquioxane Polymers*. Ph.D. Thesis, 2002. FLORIDA UNIV GAINESVILLE.
19. Hull, D. and T. W. Clyne, *An introduction to composite materials* 1996: Cambridge university press.
20. Xie. T. and I. A. Rousseau, *Facile tailoring of thermal transition temperatures of epoxy shape memory polymers*. Polymer, 2009. 50 (8): p. 1852-1856.
21. Standard, A., *ASTM D790, Standard test methods for flexural properties of unreinforced and reinforced plastics and electrical insulating materials*. ASTM International, West Conshohocken, 2002.
22. Goldstein, J. I., et al., *Scanning electron microscopy and X-ray microanalysis* 2017: Springer.
23. Minton. T. K., et al., *Atomic oxygen effects on POSS polyimides in low earth orbit*. ACS applied materials & interfaces, 2012. 4 (2): p. 492-502.
24. Von Meier, A., *Electric power systems: a conceptual introduction* 2006: John Wiley & Sons.
25. Callister, W. D., *Fundamentals of materials science and engineering*. Vol. 471660817. 2000: Wiley London.
26. Chekanov, Y., et al., *Positive temperature coefficient effect of epoxy resin filled with short carbon fibers*. Polymer journal, 1998. 30 (5): p. 381.
27. Di, W. and G. Zhang, *Resistivity-temperature behavior of carbon fiber filled semicrystalline composites*. Journal of applied polymer science, 2004. 91 (2): p. 1222-1228.
28. Pierson, H. O., *Handbook of carbon, graphite, diamonds and fullerenes: processing, properties and applications* 2012: William Andrew.
29. Callister, W. D. and D. G. Rethwisch, *Materials Science and Engineering An Introduction* 7th ed. John Wiley & Sons, Inc., 2007. 673-676.
30. Strife, J. R. and K. M. Prewo, *The thermal expansion behavior of unidirectional and bidirectional Kevlar/epoxy composites*. Journal of Composite Materials, 1979. 13 (4): p. 264-277.
31. TORAYCA, *T300 Technical Data Sheet No. CFA-001*, https://www.toraycma.com/page.php?id=661. 2018.
32. Irving. P. and C. Thiagarajan, *Fatigue damage characterization in carbon fibre composite materials using an electrical potential technique*. Smart materials and structures, 1998. 7 (4): p. 456.
33. Gall, K., et al., *Carbon fiber reinforced shape memory polymer composites*. Journal of Intelligent Material Systems and Structures, 2000. 11 (11): p. 877-886.
34. Lourie, O., D. Cox, and H. Wagner, *Buckling and collapse of embedded carbon nanotubes*. Physical Review Letters, 1998. 81 (8): p. 1638.
35. Nairn, J. A., et al. *Fracture mechanics analysis of the single-fiber pull-out test and the microbond test including the effects of friction and thermal stresses*. in *Proceeding 16th annual technology conference of the american society of composites*. 2001. Citeseer.
36. Bejan, A. and A. D. Kraus, *Heat transfer handbook*. Vol. 1. 2003: John Wiley & Sons.
37. Howell, J. R., M. P. Menguc, and R. Siegel, *Thermal radiation heat transfer* 2010: CRC press.

What is claimed is:

1. An assembly comprising:
resistive heating elements embedded in a shape memory polymer actuator, called an SMPA; and
sensing elements associated with said resistive heating elements, said sensing elements configured to sense changes in said resistive heating elements and to correlate said changes with deformation of said SMPA, wherein said resistive heating elements comprise carbon fiber-based resistive heater elements, and upon deformation of said SMPA, a density of pi-bond electrons of said carbon fiber-based resistive heater elements changes.

2. The assembly according to claim 1, wherein said sensing elements comprise electrical resistance sensors configured to sense changes in electrical resistance of said resistive heating elements.

3. The assembly according to claim 1, wherein said fiber-based resistive heater elements comprise fibers and before deformation of said SMPA some of said fibers contact each other, and upon deformation of said SMPA, an amount of contact points at which said fibers of said resistive heating elements contact each other changes.

4. The assembly according to claim 1, wherein said carbon fiber-based resistive heater elements comprise semicrystalline carbon fibers containing unordered plains of hexagonally arrayed $sp^2$ carbon atoms sheets.

5. The assembly according to claim 1, comprising a power supply controller coupled to said SMPA, and wherein electrical resistance output of said SMPA fiber-based resistive heater elements is coupled to said controller as a feedback to control a degree of deformation of said SMPA.

6. The assembly according to claim 1, wherein said SMPA is coated with a metallic layer that reflects radiative heat energy emitted by said SMPA back to said SMPA.

7. The assembly according to claim 1, wherein said SMPA is part of a low earth orbit space device.

* * * * *